(12) United States Patent
Horng et al.

(10) Patent No.: US 7,905,661 B2
(45) Date of Patent: Mar. 15, 2011

(54) RETAINING STRUCTURE FOR MOTOR ELEMENTS

(75) Inventors: Alex Horng, Kaohsiung (TW); Yu-Yuan Lu, Kaohsiung (TW); Duo-Nien Shan, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 1 day.

(21) Appl. No.: 12/496,370

(22) Filed: Jul. 1, 2009

(65) Prior Publication Data
US 2009/0261674 A1    Oct. 22, 2009

Related U.S. Application Data

(62) Division of application No. 11/590,796, filed on Nov. 1, 2006, now abandoned.

(30) Foreign Application Priority Data

Sep. 6, 2006    (TW) ............................... 95132910 A

(51) Int. Cl.
F16C 32/06    (2006.01)
(52) U.S. Cl. ........................................ 384/100; 384/107
(58) Field of Classification Search .................. 384/100, 384/107–120; 310/90; 360/99.08, 98.07; 417/354, 423.12, 423.13
See application file for complete search history.

(56) References Cited

U.S. PATENT DOCUMENTS

| | | | |
|---|---|---|---|
| 4,955,791 A | 9/1990 | Wrobel |
| 5,610,462 A | 3/1997 | Takahashi et al. |
| 6,084,328 A | 7/2000 | Yamashita et al. |
| 6,307,293 B1 | 10/2001 | Ichiyama |
| 6,336,745 B1 | 1/2002 | Horng et al. |
| 6,435,722 B1 | 8/2002 | Horng |
| 6,756,714 B2 | 6/2004 | Alex et al. |
| 6,954,017 B2 | 10/2005 | Takahashi et al. |
| 7,111,988 B2 | 9/2006 | Chen |
| 7,518,272 B2 | 4/2009 | Yeh et al. |
| 2006/0181174 A1 | 8/2006 | Liu |

*Primary Examiner* — Thomas R Hannon
(74) *Attorney, Agent, or Firm* — Muncy, Geissler, Olds & Lowe, PLLC

(57) ABSTRACT

A retaining structure for motor elements includes an axial tube and a cap. The cap includes a stop and a coupling portion. At lease one motor element is received in the axial tube. The coupling portion of the cap is engaged with a coupling section of the axial tube for securely mounting the cap to the axial tube, with the stop of the cap covering an end of the axial tube to prevent the motor element from disengaging from the axial tube. In another example, the coupling portion of the cap engages with a coupling section on a stator.

14 Claims, 5 Drawing Sheets

RETAINING STRUCTURE FOR MOTOR ELEMENTS

This application is a Divisional of co-pending application Ser. No. 11/590,796, filed on Nov. 1, 2006, and for which priority is claimed under 35 U.S.C. §120; the entire contents of which are hereby incorporated by reference.

BACKGROUND OF THE INVENTION

1. Field of the Invention

The present invention relates to a retaining structure for motor elements and, more particularly, to a retaining structure with a cap providing with a coupling portion and a stop for preventing at least one motor element from disengaging from an axial tube of the motor.

2. Description of Related Art

FIG. 1 of the drawings illustrates a conventional motor 1 comprising a base 11, a stator 12, a supporting member 13, a bearing 14, a positioning member 15, and a rotor 16. The base 11 includes an axial tube 111 for receiving the bearing 14. The stator 12 includes a winding 121. The supporting member 13 is fixed in an end of the axial tube 111 by force-fitting. An abrasion-resisting member 131 is mounted in a lower end of the supporting member 13. A restraining member 132 is placed on top of the supporting member 13 and includes a through-hole (not labeled) for retaining a shaft 161 of the rotor 16. The positioning member 15 is mounted on top of the bearing 14 to prevent the bearing 14 from moving relative to the axial tube 111 of the base 11, thereby assuring reliable assembly.

Still referring to FIG. 1, in assembly, the supporting member 13, the bearing 14, and the positioning member 15 are mounted into the axial tube 111 of the base 11 in sequence, with the supporting member 13 and the positioning member 15 respectively fixed in two ends of the axial tube 111 by force-fitting, thereby positioning the bearing 14 in the axial tube 111. The shaft 161 is rotatably extended through an axial hole (not labeled) formed by a through-hole in each of the bearing 14 and the positioning member 15 and a hole (not labeled) in the supporting member 13.

Still referring to FIG. 1, when the motor 1 turns, since the diameter of the through-hole of the retaining member 132 on top of the supporting member 13 is smaller than an end of the shaft 161 and since the retaining member 132 is engaged in a necked portion (not labeled) of the shaft 161, the rotor 16 is prevented from disengaging from the bearing 14. Further, the bearing 14 is prevented from moving in the axial tube 111, as the positioning member 15 is force-fitted in an end of the axial tube 111 of the base 11, with a bottom of the positioning member 15 pressing against a top of the bearing 14. Hence, the bearing 14 and the shaft 16 are reliably coupled to the base 11.

However, the above conventional bearing positioning structure for a motor has some drawbacks. First, the axial tube 111 easily deforms after a period of time due to heat expansion and cold shrinkage as well as stress generated during operation of the motor 1 such that the supporting member 13 and the positioning member 15 cannot be fixed in the axial tube 111. Hence, the bearing 14 is liable to disengage from the axial tube 111. Further, the dusts or impurities may enter the gap between the shaft 161 and the bearing 14 when the rotor 16 turns and creates air currents. The life of the motor 1 is thus shortened. Improvement in the bearing positioning structure for a motor is thus required.

OBJECTS OF THE INVENTION

An object of the present invention is to provide a retaining structure for motor elements with improved assembling reliability and prolonged motor life by preventing at least one motor element from disengaging from the axial tube.

Another object of the present invention is to provide a retaining structure for motor elements preventing dusts or impurities from entering the gap between the shaft and the bearing, thereby prolonging the life of the motor and improving assembling reliability.

SUMMARY OF THE INVENTION

In accordance with an aspect of the present invention, a retaining structure for motor elements comprises an axial tube and a cap. The axial tube includes a coupling section, and at least one motor element is received in the axial tube. The cap includes a stop and a coupling portion. The coupling portion of the cap is engaged with the coupling section of the axial tube for securely mounting the cap to the axial tube, with the stop of the cap covering an end of the axial tube to prevent the at least one motor element from disengaging from the axial tube.

Preferably, the coupling portion is formed on a bottom of the cap.

Preferably, the coupling portion of the cap is a hook or an engaging groove.

Preferably, a restraining member is mounted in the axial tube for limiting axial movement of a shaft of a rotor.

Preferably, the coupling section of the axial tube is a flange.

Preferably, the flange of the axial tube includes an inclined guiding face for guiding the coupling portion of the cap to engage with the flange of the axial tube.

Preferably, the cap further includes an annular wall projecting from an outer face of the stop and having an end edge close to an inner face of a rotor.

Preferably, a positioning ring is mounted in the axial tube and located between the motor element and the cap to preventing the motor element from becoming loosened and from shifting in the axial tube.

Preferably, the at least one motor element includes at least one of a restraining member, a bearing, and a positioning member.

In accordance with another aspect of the present invention, a retaining structure for motor elements comprises an axial tube, a stator, and a cap. At least one motor element is received in the axial tube. The stator includes a first coupling section. The cap includes a stop and a coupling portion. The first coupling section of the stator is engaged with the coupling portion of the cap for securely mounting the cap to an end of the axial tube, with the stop of the cap covering an end of the axial tube to prevent the at least one motor element from disengaging from the axial tube.

Preferably, the coupling portion is formed on a top portion of the cap.

Preferably, the coupling portion of the cap is a hook or an engaging groove.

Preferably, a restraining member is mounted in the axial tube for limiting axial movement of a shaft of a rotor.

Preferably, the cap further includes an annular wall projecting from an outer face of the stop and having an end edge close to an inner face of a rotor.

Preferably, the stator further includes a second coupling section and wherein the axial tube includes an engaging portion for engaging with the second coupling section of the stator, thereby securely mounting the stator to the axial tube.

Preferably, a positioning ring is mounted in the axial tube and located between the motor element and the cap to preventing the motor element from becoming loosened and from shifting in the axial tube.

Preferably, the at least one motor element includes at least one of a restraining member, a bearing, and a positioning member.

Preferably, the first coupling section is a hook.

Other objects, advantages and novel features of this invention will become more apparent from the following detailed description when taken in conjunction with the accompanying drawings.

DETAILED DESCRIPTION OF THE PREFERRED EMBODIMENTS

Figure 1:
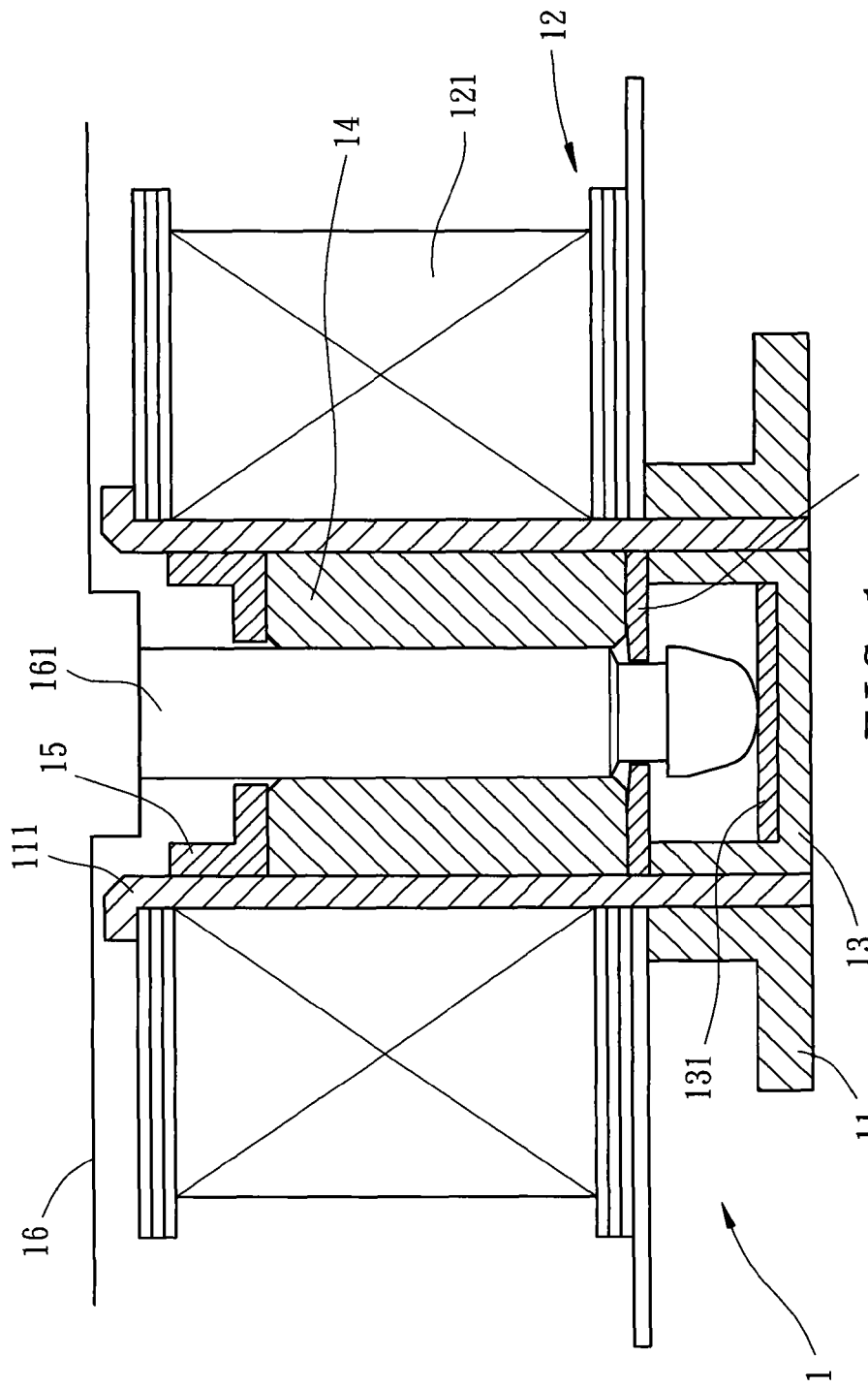
FIG. 1 is a sectional view of a conventional motor.
Figure 2:
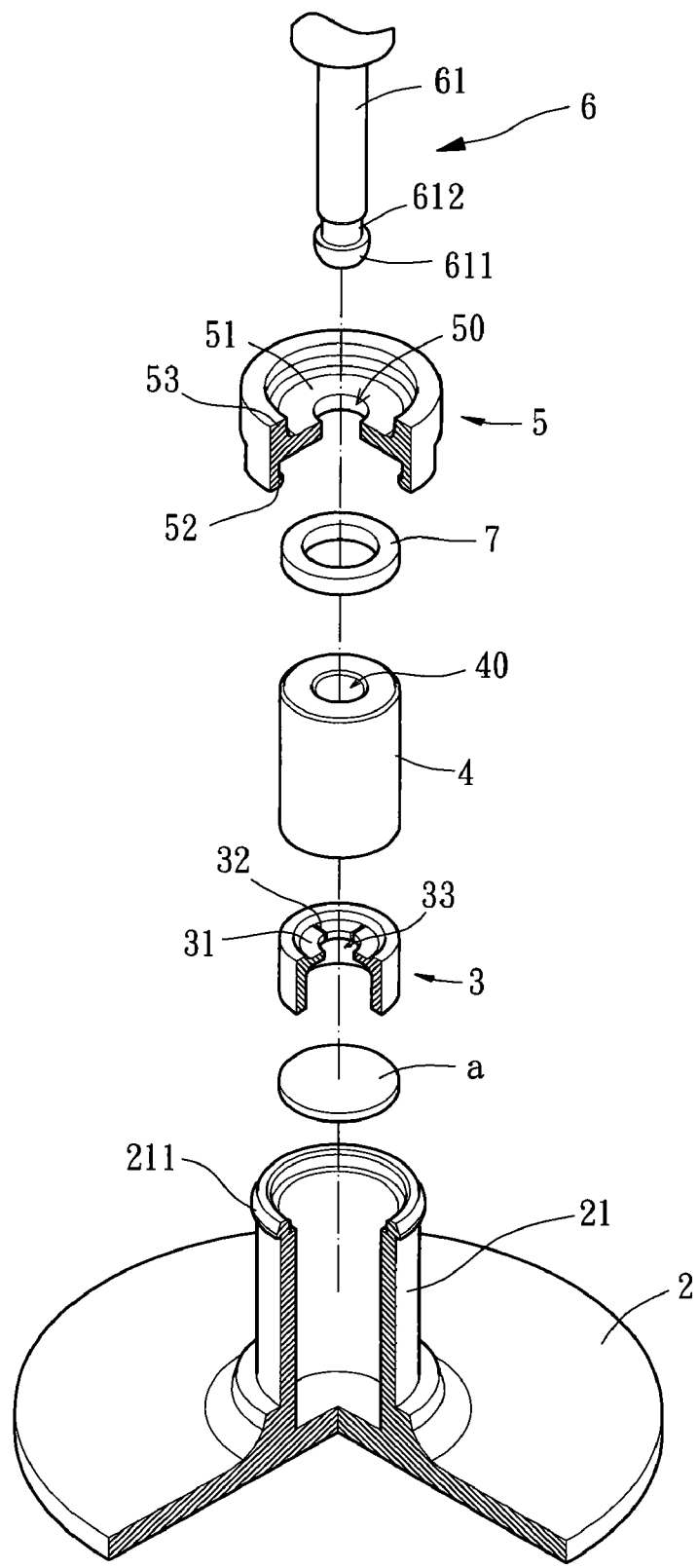
FIG. 2 is an exploded perspective view, party cutaway, of a first embodiment of a retaining structure for motor elements in accordance with the present invention.
Figure 3:
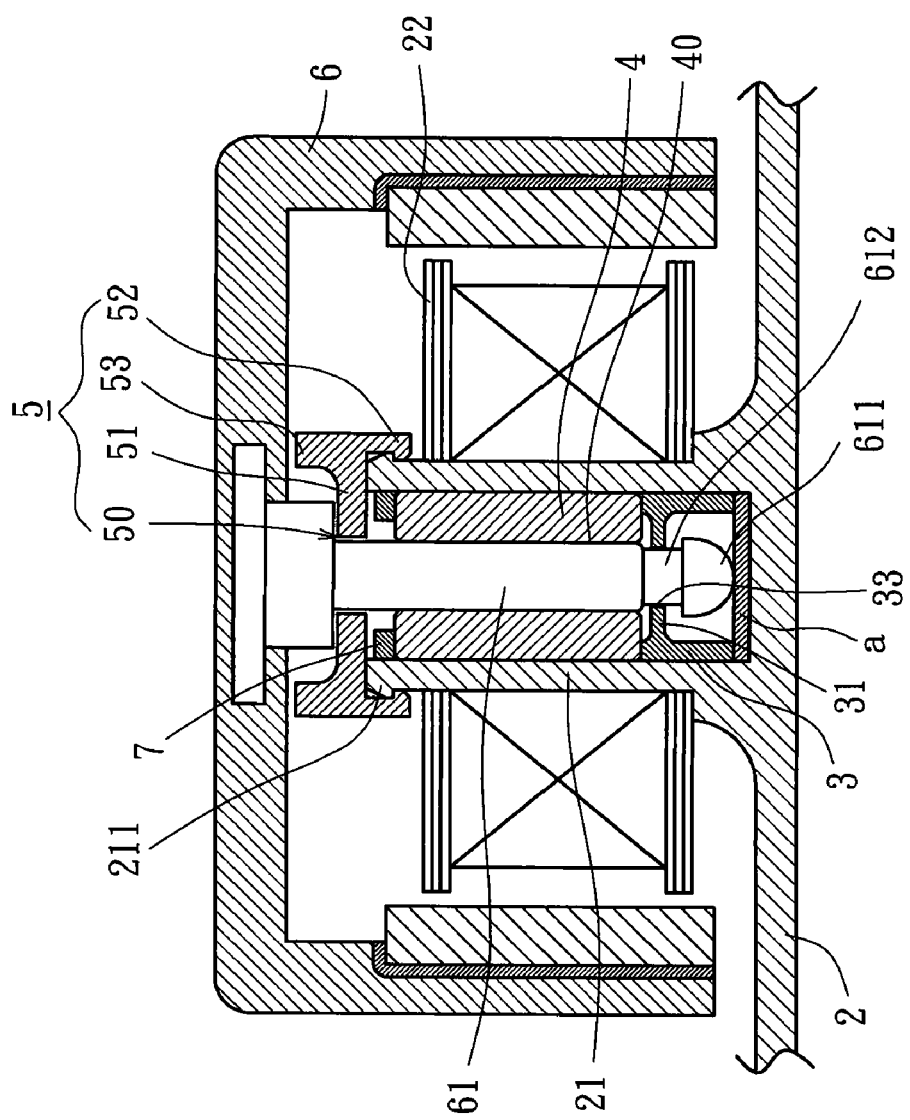
FIG. 3 is a sectional view of the first embodiment of the retaining structure for motor elements in accordance with the present invention.

Referring to FIGS. 2 and 3, a first embodiment of a retaining structure for motor elements in accordance with the present invention comprises a base 2, a restraining member 3, a bearing 4, a cap 5, a rotor 6, and a positioning ring 7. Mounted to the base 2 is an axial tube 21 and a stator 22, wherein the axial tube 21 may be assembled to or integrally formed with the base 2 for receiving motor elements including the restraining member 3, the bearing 4, the cap 5, and the positioning ring 7. The stator 22 may be of radial winding type or axial winding type. The restraining member 3 restrains axial movement of a shaft 61 of the rotor 6 relative to the axial tube 21. The bearing 4 may be an oily bearing, a ball bearing, a fluid dynamic bearing, etc. The shaft 61 is rotatably extended through the bearing 4. The cap 5 is engaged with the axial tube 21 to prevent the motor elements from disengaging from the axial tube 21. Preferably, the positioning ring 7 is mounted in the axial tube 21 by force-fitting and located between the bearing 4 and the cap 5 to prevent the bearing 4 from becoming loosened and from shifting in the axial tube 21.

Still referring to FIGS. 2 and 3, the axial tube 21 of the first embodiment in accordance with the present invention includes a coupling section 211 that extends radially and annularly on an end edge of the axial tube 21. Preferably, the coupling section 211 is a flange and includes an inclined guiding face (not labeled) for guiding the cap 5 to a position securely engaged with the coupling section 211.

Still referring to FIGS. 2 and 3, the restraining member 3 of the first embodiment in accordance with the present invention includes a plurality of protrusions 31, a plurality of slits 32, and a through-hole 33. The protrusions 31 extend radially inward form an inner circumference of the restraining member 3 to the through-hole 33 for restraining axial movement of the shaft 61, with one of the slit 32 formed between the two adjacent protrusions 31 so as to provide the protrusions 31 with improved deforming capacity. The through-hole 33 is defined by the protrusions 31 and in a center of the restraining member 3, with the shaft 61 extending through the through-hole 33 of the restraining member 3.

Still referring to FIGS. 2 and 3, the cap 5 of the first embodiment in accordance with the present invention is preferably a ring member corresponding to the axial tube 21 and includes a through-hole 50, a stop 51, a coupling portion 52, and an annular wall 53. The through-hole 50 is defined in a center of the cap 5, allowing the shaft 61 to extend therethrough. The stop 51 is a top portion of the cap 5 for preventing the motor elements in the axial tube 21 from disengaging from the axial tube 21. The coupling portion 52 may be a hook or an engaging groove. In this example, the coupling portion 52 is a hook formed on a bottom of the cap 5 for engaging with the coupling section 211 of the axial tube 21. The annular wall 53 extends axially outward from an outer face of the stop 51 and includes an end edge close to an inner face of the rotor 6.

Still referring to FIGS. 2 and 3, in assembly of the motor elements of the first embodiment in accordance with the present invention, the restraining member 3 is placed into the axial tube 21, with an abrasion-resistant member "a" sandwiched between the restraining member 3 and the bottom end of the axial tube 21 for preventing damage to the base 2 due to friction resulting from rotation of the shaft 61 of the rotor 6. Then, the bearing 4 is mounted into the axial tube 21, with an end face of the bearing 4 abutting against the top of the restraining member 3. The positioning ring 7 is then mounted in the axial tube 21 by force-fitting and abuts against the other end face of the bearing 4. Finally, the cap 5 is mounted to the axial tube 21 by moving the coupling portion 52 of the cap 5 along the inclined guiding face of the coupling section 211. Hence, the cap 5 is reliably coupled to the upper end of the axial tube 2.

Still referring to FIGS. 2 and 3, the shaft 61 is extended through an axial hole formed by a through-hole (not labeled) of the positioning ring 7, the through-hole 50 of the positioning member 5, and the through-holes 40 and 33 of the bearing 4 and the restraining member 3. Since the diameter of the through-hole 33 of the restraining member 3 is slightly smaller than the diameter of an end 611 of the shaft 61, a force is applied to forcibly pass the end 611 of the shaft 61 through the through-hole 33 that expands due to deformation of the protrusions 31. After the end 611 of the shaft 61 passes through the through-hole 33 and a necked portion 612 reaches the through-hole 33, the protrusions 31 return to their original position and engage with the necked portion 612, thereby limiting axial movement of the shaft 61 relative to the axial tube 21.

Still referring to FIGS. 2 and 3, the shaft 61 rotates in the axial hole formed by the restraining member 3, the bearing 4 and the cap 5 when the rotor 6 turns. Since the coupling portion 52 of the cap 5 reliably engages with the coupling section 211 of the axial tube 21 and since the stop 51 covers an end of the axial tube 21, the bearing 4 and the positioning ring 7 are reliably retained in the axial tube 21 without the risk of disengagement, even under heat expansion and cold shrinkage, thereby enhancing assembling reliability and prolonging the life of the motor.

Still referring to FIGS. 2 and 3, since the diameter of the through-hole 50 of the cap 5 is slightly greater than the diameter of the shaft 61 and since the outer edge of the annular wall 53 of the cap 5 is close to the inner face of the rotor 6, air currents generated during rotation of the rotor 6 will not carry the dusts or impurities into the gap between the shaft 61 and the shaft 4. This avoids non-smooth operation of the rotor 6 and damage to the bearing 4 or other elements. Further, in a case that the bearing 4 is an oily bearing, the cap 5 prevents leakage of the lubricating oil in the bearing 4, prolonging the life of the motor.

Figure 4:
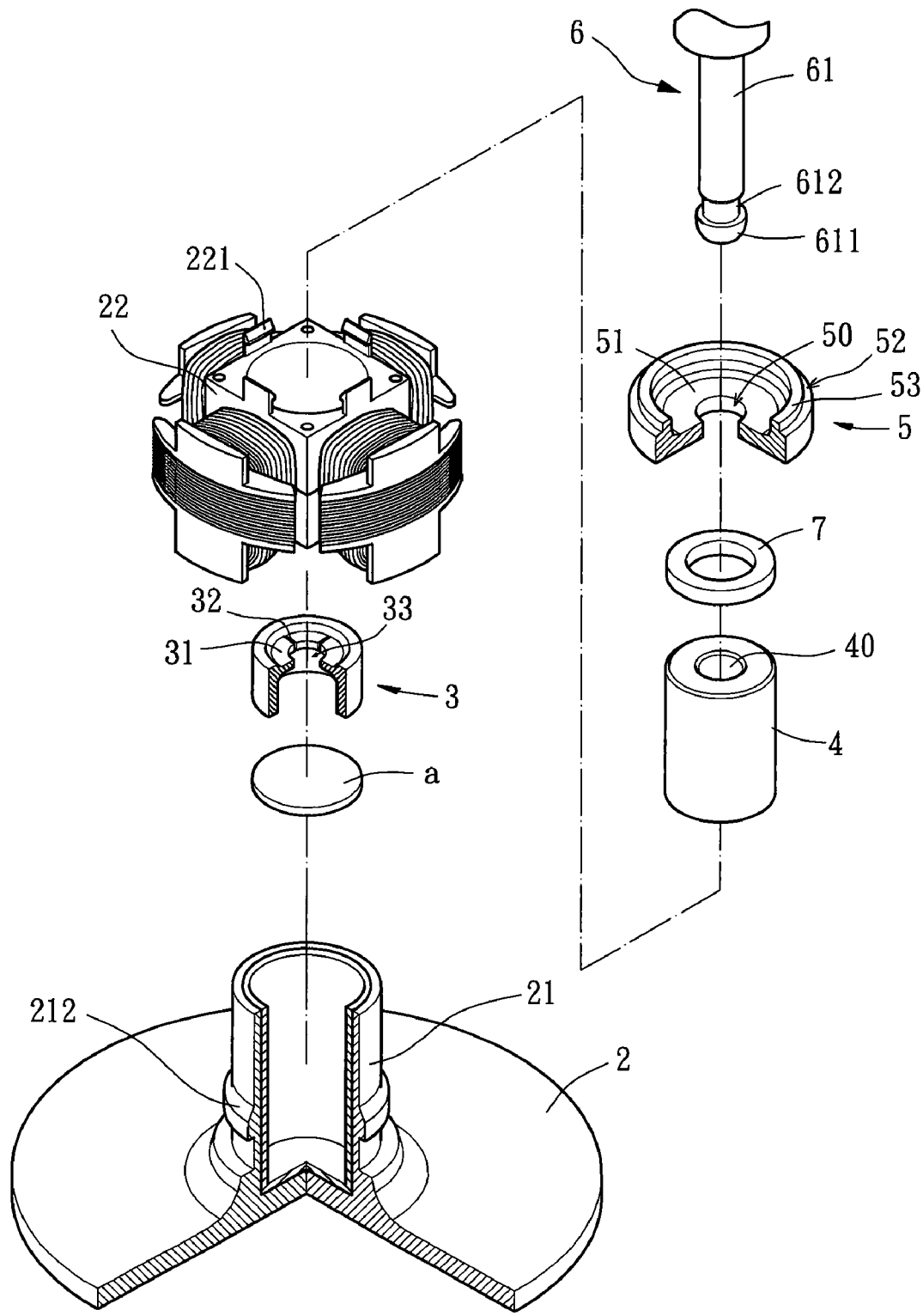
FIG. 4 is an exploded perspective view, party cutaway, of a second embodiment of the retaining structure for motor elements in accordance with the present invention.
Figure 5:
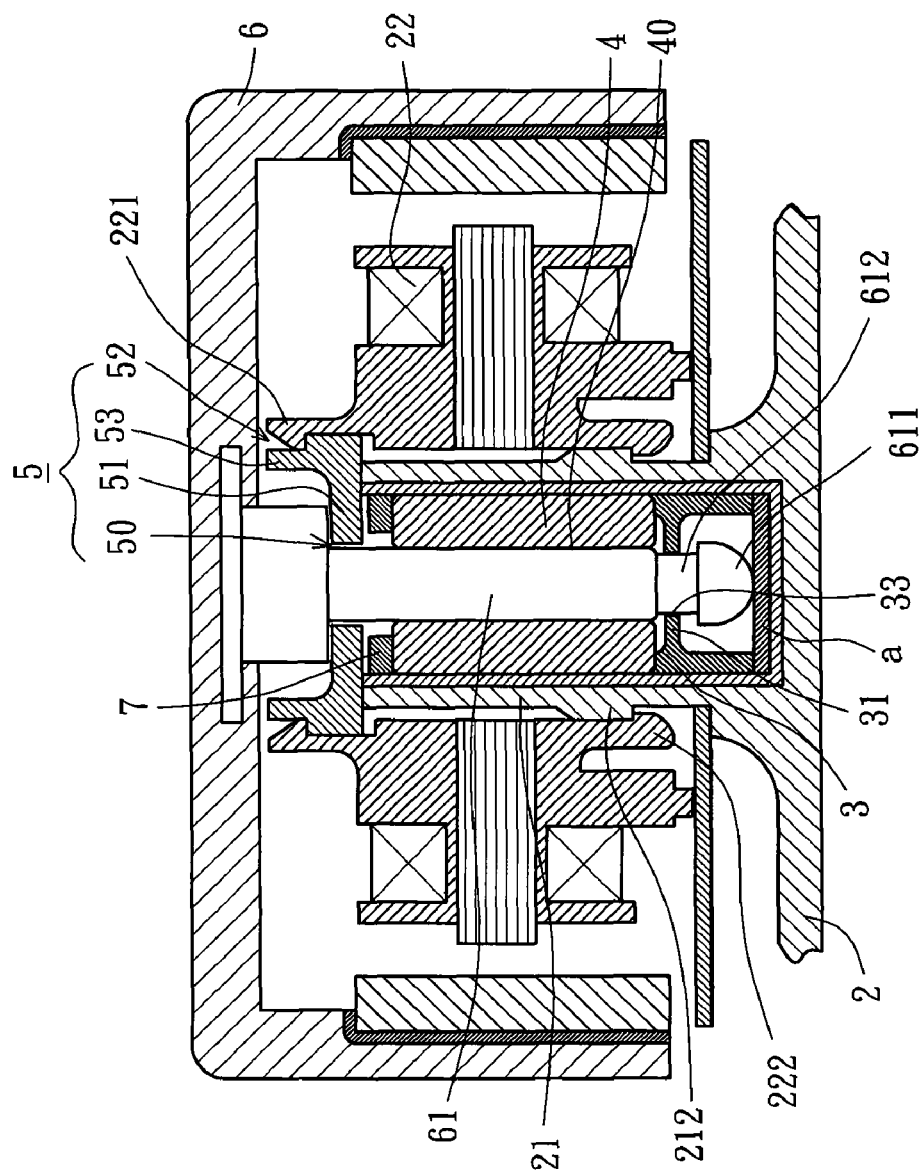
FIG. 5 is sectional view of the second embodiment of the retaining structure for motor elements in accordance with the present invention.

FIGS. 4 and 5 illustrate a second embodiment of the retaining structure for motor elements in accordance with the present invention. As compared to the second embodiment, the stator 22 of the second embodiment includes a first coupling section 221 on top of the stator 22 for engaging with the coupling portion 52 of the cap 5. Hence, the cap 5 is reliably mounted to the end of the axial tube 21 through the stator 22. Preferably, the coupling portion 52 is an engaging groove for engaging with the first coupling section 221. Preferably, the coupling portion 52 is annularly formed along a circumference of the stop 51.

Still referring to FIGS. 4 and 5, the stator 22 of the second embodiment is engaged with the axial tube 21 by providing a second coupling section 222 on a bottom portion of the stator 22 for engaging with an engaging portion 212 of the axial tube 21. Hence, the stator 22 is reliably fixed to the axial tube 21. Preferably, the engaging portion 212 is formed on an outer circumference of the axial tube 21 and corresponding to the second coupling section 222. Preferably, the first and second coupling sections 221 and 222 are hooks.

Still referring to FIGS. 4 and 5, in assembly of the motor elements of the second embodiment, the restraining member 3, the bearing 4, the positioning ring 7, and the cap 5 are mounted into the axial tube 21 in sequence. Next, the first coupling section 221 and the second coupling section 222 of the stator 22 are respectively engaged with the coupling portion 52 of the cap 5 and the engaging portion 212 of the axial tube 22 such that the stator 22 is reliably fixed to the axial tube 21. Hence, the stator 22 and the cap 5 are reliably engaged, the stop 51 of the cap 5 covers an end of the axial tube 21, and the cap 5 is reliably coupled to the axial tube 21. The motor elements in the axial tube 21 are reliably retained in the axial tube 21 without the risk of disengagement, even under heat expansion and cold shrinkage, thereby enhancing assembling reliability and prolonging the life of the motor.

As mentioned above, in the conventional bearing positioning structure has the drawback of easy deformation in the axial tube 111 due to heat expansion and cold shrinkage as well as stress generated during operation of the motor such that the supporting member 13, the axial tube 14 and the positioning member 15 cannot be fixed in the axial tube 111, leading to unreliable positioning of the bearing 14. Namely, the bearing 14 is liable to become loosened and, thus, disengages from the axial tube 111.

In the present invention, the above drawback is eliminated by providing a cap 5 including a stop 51 and a coupling portion 52, wherein the coupling portion 52 engages with a coupling section 211 on the axial tube 21 or a first coupling portion 221 on the stator 22 and wherein the stop 51 forms the through-hole 50 in the center and covers an end of the axial tube 21 to prevent the motor elements from disengaging from the axial tube 21 while preventing dusts or impurities from entering the gap between the shaft 61 and the bearing 4 by the annular wall 53 on the stop 51. The assembling reliability is enhanced and the life of the motor is prolonged.

While the principles of this invention have been disclosed in connection with specific embodiments, it should be understood by those skilled in the art that these descriptions are not intended to limit the scope of the invention, and that any modification and variation without departing the spirit of the invention is intended to be covered by the scope of this invention defined only by the appended claims.

What is claimed is:

1. A retaining structure for motor elements comprising:
an axial tube for receiving at least one motor element;
a stator including a first coupling section; and
a cap including a stop and a coupling portion;
wherein the first coupling section of the stator is engaged with the coupling portion of the cap for securely mounting the cap to an end of the axial tube, with the stop of the cap covering an end of the axial tube to prevent said at least one motor element from disengaging from the axial tube,
wherein the coupling portion of the cap is a hook or an engaging groove.

2. The retaining structure for motor elements as claimed in claim 1, wherein the coupling portion is formed on a top portion of the cap.

3. The retaining structure for motor elements as claimed in claim 1, further comprising a restraining member mounted in the axial tube for limiting axial movement of a shaft of a rotor.

4. The retaining structure for motor elements as claimed in claim 1, wherein the cap further includes an annular wall projecting axially from an outer face of the stop and having an end edge close to an inner face of a rotor.

5. The retaining structure for motor elements as claimed in claim 1, wherein the stator further includes a second coupling section and wherein the axial tube includes an engaging portion for engaging with the second coupling section of the stator, thereby securely mounting the stator to the axial tube.

6. The retaining structure for motor elements as claimed in claim 1, wherein said at least one motor element includes at least one of a restraining member, a bearing, and a positioning member.

7. The retaining structure for motor elements as claimed in claim 1, wherein the first coupling section is a hook.

8. A retaining structure for motor elements comprising:
an axial tube for receiving at least one motor element;
a stator including a first coupling section;
a cap including a stop and a coupling portion; and
a positioning ring mounted in the axial tube and located between a bearing and the cap to prevent the bearing from becoming loosened and from shifting in the axial tube;
wherein the first coupling section of the stator is engaged with the coupling portion of the cap for securely mounting the cap to an end of the axial tube, with the stop of the cap covering an end of the axial tube to prevent said at least one motor element from disengaging from the axial tube.

9. The retaining structure for motor elements as claimed in claim 8, wherein the coupling portion is formed on a top portion of the cap.

10. The retaining structure for motor elements as claimed in claim 8, further comprising a restraining member mounted in the axial tube for limiting axial movement of a shaft of a rotor.

11. The retaining structure for motor elements as claimed in claim 8, wherein the cap further includes an annular wall projecting axially from an outer face of the stop and having an end edge close to an inner face of a rotor.

12. The retaining structure for motor elements as claimed in claim 8, wherein the stator further includes a second coupling section and wherein the axial tube includes an engaging portion for engaging with the second coupling section of the stator, thereby securely mounting the stator to the axial tube.

13. The retaining structure for motor elements as claimed in claim 8, wherein said at least one motor element includes at least one of a restraining member, a bearing, and a positioning member.

14. The retaining structure for motor elements as claimed in claim 8, wherein the first coupling section is a hook.

* * * * *